US006606499B1

United States Patent
Verrier et al.

(10) Patent No.: US 6,606,499 B1
(45) Date of Patent: Aug. 12, 2003

(54) DYNAMIC CHANNEL ALLOCATION METHOD IN A CELLULAR RADIOCOMMUNICATION NETWORK

(75) Inventors: David Verrier, Paris (FR); Patrick Plas, Paris (FR)

(73) Assignee: France Telecom, Paris (FR)

(*) Notice: Subject to any disclaimer, the term of this patent is extended or adjusted under 35 U.S.C. 154(b) by 0 days.

(21) Appl. No.: 09/445,164

(22) PCT Filed: Jun. 2, 1998

(86) PCT No.: PCT/FR98/01106
§ 371 (c)(1),
(2), (4) Date: Feb. 28, 2000

(87) PCT Pub. No.: WO98/56204
PCT Pub. Date: Dec. 10, 1998

(30) Foreign Application Priority Data

Jun. 4, 1997 (FR) .............................. 97 06873

(51) Int. Cl.$^7$ ........................... H04Q 7/20; H04Q 7/00; H04B 7/00
(52) U.S. Cl. ..................... 455/452; 455/512; 455/450; 370/332
(58) Field of Search .................. 455/67.1, 67.3, 455/450, 451, 452–464, 509, 512–513; 370/329, 330, 332–333, 341

(56) References Cited

U.S. PATENT DOCUMENTS

| 5,263,176 A | * | 11/1993 | Kojima et al. | ............... 455/512 |
| 5,507,008 A | * | 4/1996 | Kanai et al. | ................ 455/512 |
| 5,666,655 A | * | 9/1997 | Ishikawa et al. | ............ 455/512 |
| 6,023,623 A | * | 2/2000 | Benkner et al. | ............ 455/452 |

FOREIGN PATENT DOCUMENTS

| GB | 2 266 433 | 10/1993 | ................. 455/452 |
| WO | WO 96/25829 A1 | * 8/1996 | ................. 455/452 |
| WO | WO96/31075 | 10/1996 | ................. 455/450 |

OTHER PUBLICATIONS

Sirin Tekinay et al., <<Handover and Channel Assignment in Mobile Cellular Networks>>, IEEE Communications Magazine, Nov. 1991, vol. 29, No. 11, pp. 42–46.

Mario Frullone et al., <<Dynamic Channel Allocation for ATDMA>>, Proc. of the Race Summit Lisbon, Nov. 1995, pp. 203–299.

Yoshihiko Akaiwa et al., <<Channel Segregation—A Self–Organized Dynamic Allocation Method: Application to TDMA/FDMA Microcellular System>>, IEEE Journal on Selected Areas in Communications, vol. 11, No. 6, Aug. 1993, pp. 949–954.

E. Del Re et al., <<Handover and Dynamic Channel Allocation Techniques in Mobile Cellular Networks>>, IEEE Transactions on Vehicular Technology, vol. 44, No. 2, May 1995, pp. 229–237.

(List continued on next page.)

*Primary Examiner*—Nay Maung
*Assistant Examiner*—Raymond Persino
(74) *Attorney, Agent, or Firm*—Brian C. Rupp; Gardner Carton & Douglas LLC (57) ABSTRACT

For each base station of the network, each physical channel processed by the dynamic channel allocation (DCA) method is associated with a respective priority index computed from radio parameters periodically measured with respect to communications taking place on such physical channel. For allocating a new communication channel, the free and accessible channels having the highest priority are preferentially selected. The priority indices may further be used to dynamically transfer communications to free channels of higher priority, which optimises the distribution of the bandwidth between cells as well as the quality of the communications.

3 Claims, 6 Drawing Sheets

OTHER PUBLICATIONS

M. Frodigh, <<Bounds on the Performance of DCA–Algorithms in Highway Microcellular Systems>>, IEEE Transactions on Vehicular Technology, vol. 43, No. 3, Aug. 1994, pp. 420–427.

L.J. Cimini et al., <<Call Blocking Performance of Distributed Algorithms for Dynamic Channel Allocation in Microcells>>, IEEE Transactions on Communications, vol. 42, No. 8, Aug. 1994, pp. 2600–2607.

* cited by examiner

| | | | | |
|---|---|---|---|---|
| F1(1) | F1(2) | --- | F1(N1) | $P1(1) \geqslant P1(2) \geqslant ... \geqslant P1(N1)$ |
| T1(1) | T1(2) | --- | T1(N1) | |
| P1(1) | P1(2) | --- | P1(N1) | |

L1

| | | | | |
|---|---|---|---|---|
| F2(1) | F2(2) | --- | F2(N2) | $P2(1) \geqslant P2(2) \geqslant ... \geqslant P2(N2)$ |
| T2(1) | T2(2) | --- | T2(N2) | |
| P2(1) | P2(2) | --- | P2(N2) | |

L2

| | | | | |
|---|---|---|---|---|
| F3(1) | F3(2) | --- | F3(N3) | $P3(1) \geqslant P3(2) \geqslant ... \geqslant P3(N3)$ |
| T3(1) | T3(2) | --- | T3(N3) | |
| NB(1) | NB(2) | --- | NB(N3) | |
| LOC(1) | LOC(2) | --- | LOC(N3) | |
| P3(1) | P3(2) | --- | P3(N3) | |

DYNAMIC CHANNEL ALLOCATION METHOD IN A CELLULAR RADIOCOMMUNICATION NETWORK

BACKGROUND OF THE INVENTION

The present invention relates to the dynamic channel allocation (DCA) for a cellular radiocommunication networks such as a GSM-type network.

A distinction is made between interference-adapted DCA schemes and traffic-adapted DCA schemes. The interference-adapted schemes take account of the quality of the radio signals received, and dynamically allocate the channels assumed to have the lowest noise. The traffic-adapted schemes are based on the knowledge of which channels are used in each cell in order to ensure that two identical channels are not allocated in adjacent cells: they do not rely on any radio quality criterion but require information to be exchanged between the different channel-allocating units within the network.

In the field of the interference-adapted DCA algorithms, the algorithms proposed so far are designed to allocate channels on the radio link for packet mode communications (see M. FRULLONE et al: "Dynamic Channel Allocation for ATDMA", Proc. of the Race Summit, Lisbon, Nov. 1995, pages 299–203). This is not suitable for networks which support communications in circuit mode, such as GSM. As for the traffic-adapted DCA algorithms, the studies that have been conducted are basically theoretical. Due to the fact that these mechanisms require large exchanges of signaling between the different entities allocating radio resources within the network, they are not particularly well suited to current cellular networks, which do not facilitate such exchanges. At present, therefore, they are of little interest.

These days, mobile network operators apply channel planning techniques as a means of distributing the physical channels to be allocated amongst the different cells of the network. The term "planning" means that each cell is allocated its own list of physical channels from which channels are selected as they are allocated. In the majority of systems, the channel planning is simplified to a frequency planning.

The advantage of such a technique is that it is possible to ensure that no channel is allocated to two adjacent cells, which reduces the risk of interference between two channels allocated in adjacent cells. This ensures a certain radio quality on each channel allocated in the network.

However, frequency planning has the following disadvantages:

1) Its implementation is fastidious. The more irregular the topology of the cellular coverage is (different cell sizes, non-symmetrical patterns, . . . ), the more difficult it is to plan. The concept of a multicellular network with microcells and "umbrella" macrocells makes any attempt at frequency planning even more difficult since it introduces several levels of coverage, each requiring a frequency plan. This also has the effect of restricting the number of frequencies allocated to each cell (thereby limiting traffic).

2) Frequency planning does not make it easy to change the network topology. For example, each time base stations are added to or withdrawn from the network, a new frequency plan is needed over a significant part of the network. This aspect is becoming even more complex now that operators are required to modify their cellular engineering on a frequent basis (integrating microcell zones into the existing network).

3) Frequency planning does not allow the system to allocate resources to mobiles in a flexible manner. In view of the fixed (and limited) number of resources allocated by cells, the system is unable to absorb local traffic peaks due to the lack of available resources.

Whilst frequency planning may remain an interesting solution in a macro-cellular environment (simple and regular cell configuration, homogeneous traffic distribution), it is less so when it comes to other types of environment (microcellular, "umbrella" cells, traffic peaks, . . . ).

The sharp increase currently seen in mobile communications traffic due to the success of portable telephones has forced operators to increase the density of their networks. They have therefore now been forced to combine any type of cellular configuration (macrocells, microcells, umbrella cells, omnidirectional antenna, directional antenna, . . .) and accordingly need a more flexible mechanism for allocating channels than frequency planning.

WO96/31075 discloses a method of dynamically allocating channels for a cellular radio network in which "statistical preferences", i.e. priorities, are assigned to different frequency channels within a same cell. The selection of which frequency channel is to be used is based on these "statistical preferences". The process of determining "statistical preferences" is based on measurements of channel characteristics, taken when these channels are not being used.

The DCA mechanism disclosed in this document WO96/31075 does not use radio measurements taken during a communication. The same applies to the mechanism described in U.S. Pat. No. 5,507,008. According to the latter document, when a call is being established, the base station of a cell checks that the envisaged channel is not subject to too much interference. If the channel-to-interferer ratio (CIR) is too low, the base station moves on to the next channel in a general list common to all the cells.

GB-A-2,266,433 discloses another DCA mechanism in which several frequency lists are held for each cell. The base station determines a transmission loss of a signal returned by a mobile station in order to select a list of frequencies, from which the channel is selected on the basis of a quality criterion. This quality criterion may be based in particular on the channel-to-interferer ratio. The frequency lists are updated depending on the success encountered during previous attempts to select the channels concerned. Here again, no use is made of radio measurements taken during communication.

An object of the invention is to propose an efficient technique for allocating radio resources dedicated to communications, which does not require prior frequency planning and which therefore releases the operator from the above constraints.

The method is also intended to enable the network to absorb traffic peaks under certain conditions.

SUMMARY OF THE INVENTION

The invention thus proposes a method of dynamically allocating channels in a cellular radio network, wherein a set of physical channels is used in said network to form logical channels dedicated to communications in circuit mode between mobile stations and geographically distributed base stations, each logical channel belonging to a physical channel, and wherein, for each communication established on a logical channel between a base station and a mobile station, radio parameters representative of conditions of said communication on said logical channel are periodically measured. According to the invention, the method comprises the following steps, carried out for each base station:

associating a respective priority index to each physical channel of said set;

holding a first list of physical channels which are not being used by said base station to communicate with any mobile station, and at least a second list of busy physical channels, each having at least one active logical channel dedicated to a communication currently taking place between said base station and any mobile station;

updating the priority indices associated with the physical channels of the second list on the basis of the radio parameters measured in relation to communications taking place on the logical channels belonging to said physical channels of the second list; and     when establishing a communication with a mobile station, selecting for said communication an accessible and non-active logical channel belonging to a physical channel whose priority index is maximum.

As a result of this DCA mechanism, it is no longer necessary, before putting the network into service, to plan the allocation of frequencies between the cells in order to distribute between them the radio resources that can be allocated to mobile communications. The fact that an operator no longer needs to undertake any frequency planning means that there will be greater flexibility in deployment of the network. For example, the integration of micro-cellular layers in a macro-cellular network will be largely facilitated because there will no longer be any need to share the radio spectrum between the different layers of cells and between cells within a same layer.

The method allows the channels to be automatically planned between the cells. It ensures that the system is converged rapidly and automatically to a stable configuration in which the radio resources are correctly distributed between the cells (no channel overlap between two adjacent cells). Furthermore, this, DCA method is very reactive in terms of the various modifications which might be made in the network (changes in topology, traffic variations) since it knows how to modify the distribution of channels between cells accordingly. The DCA method proposed by the invention can therefore be used with all types of configuration used in a GSM or similar network.

The invention has the advantage of requiring no modification to the current signaling protocols of a network of the GSM type. In order to apply the invention, it is sufficient to implement the DCA method at the level of the BSC (base station controllers).

Although one of the advantages of the DCA mechanism is that no frequency planning (FCA) is needed, the DCA mechanism proposed by the invention is nevertheless not incompatible with frequency planning. A GSM operator can apply this DCA mechanism in a network which also uses a frequency plan. In fact, for each cell, the extent of the radio spectrum in which the DCA algorithm will use resources can be specified. This may be done simply by suitably selecting the set of physical channels subjected to the method. The invention will then allow FCA/DCA combinations of all types, bringing great flexibility in the deployment of the network.

A preferred implementation of the method according to the invention further comprises, for each base station, the step of comparing the priority indices of channels from the first and second lists in order to trigger a handover from a logical channel belonging to a busy physical channel from the second list to an accessible logical channel belonging to a physical channel from the first list whose priority index is higher than that of said busy physical channel from the second list This improves the convergence speed of the DCA algorithm to a stable configuration. However, the main advantage is the possibility to optimise the communication quality on the channels used: if a cell tries to use a channel that is already being used by an adjacent cell, it will rapidly detect the presence of interference and choose another channel by means of the handover procedure (automatic intra-cellular transfer of communication).

DESCRIPTION OF PREFERRED EMBODIMENTS

Figure 1:
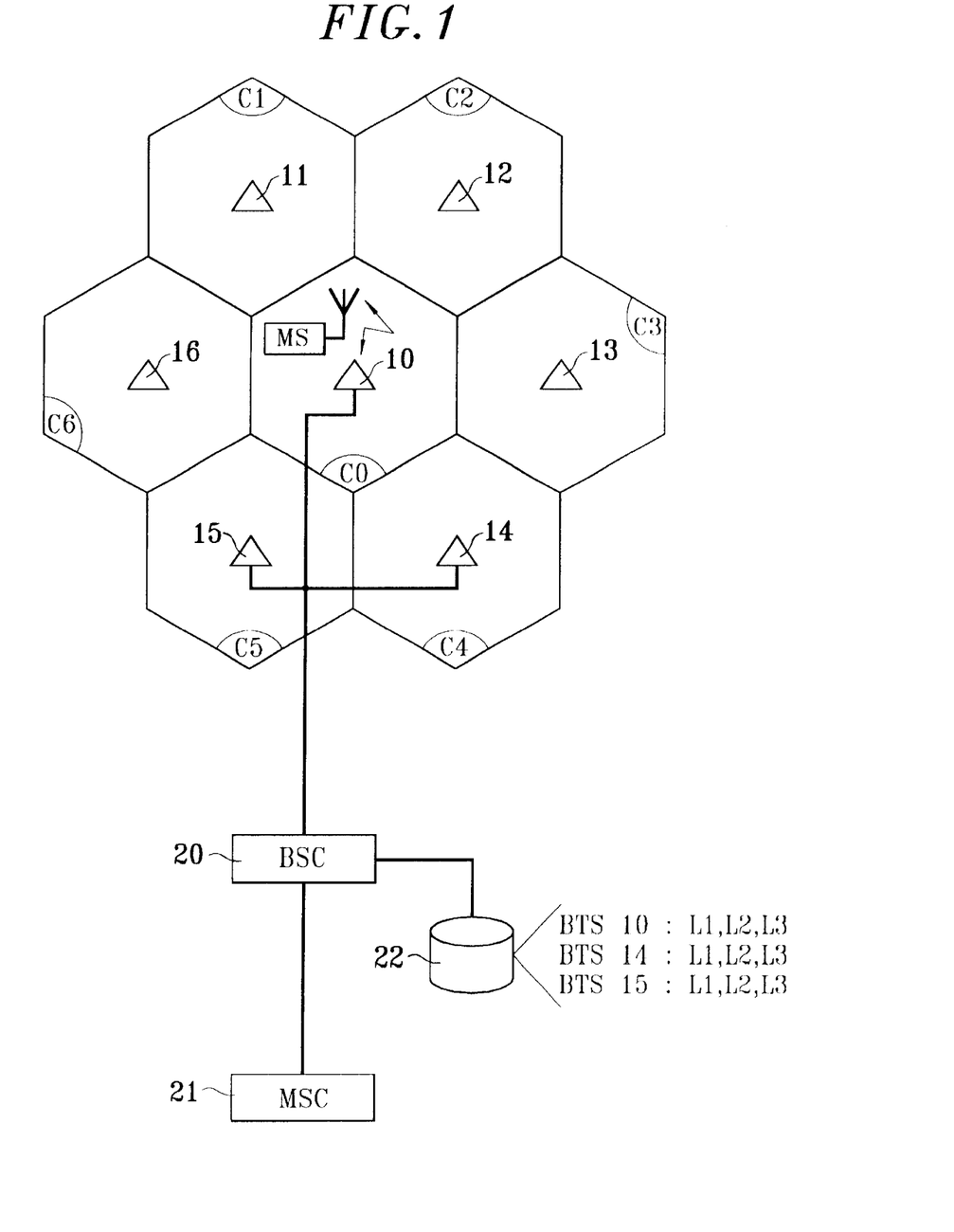
FIG. 1 is a diagram of a cellular radio network implementing the invention.

FIG. 1 shows seven base stations (BTS) 10–16 of a cellular radiotelephone network. The zone covered by each base station 10–16 is referred to as a cell C0–C6 and is shown in stylised form as a hexagon in FIG. 1.

Throughout this description, it will be assumed that the cellular network is a network of the GSM type, although this does not restrict the scope of the description. In a network of this type, each base station is connected to a functional unit referred to as a base station controller (BSC), it being possible for each BSC to control one or more base stations. Accordingly, in the case shown in FIG. 1, the BSC 20 is associated with the base stations 10, 14, 15.

Each BSC is connected to a mobile switching centre (MSC) 21 which acts in particular as an interface with the public switched telephone network.

GSM systems use frequency division (FDMA) and time division (TDMA) multiple access mechanisms. Each physical radio communication channel is therefore identified by a carrier frequency and a times lot index locating the time position of the channel in the TDMA frame (8 slots per frame in the case of GSM).

The logical traffic channels (TCH) most often used to transmit voice or data use full physical channels. However, certain types of dedicated channels use only a fraction of a physical channel. This is the case, for example, with half-rate traffic channels which can be multiplexed by pairs on the same physical channel. The logical signaling channels referred to as SDCCH (Stand-alone Dedicated Control Channel) are used to carry call control messages, mobility management messages and radio resource management messages. The SDCCH channel is the first channel allocated to a mobile when establishing a call. It is then released to make way for a TCH channel with its associated signaling channel (SACCH Slow Associated Control Channel) in the case of voice or data transfer services. For certain services, the SDCCH channel may nevertheless be retained. This will be the case with short message transmission services in particular. A number M of SDCCH channels may be multiplexed on the same physical channel (M=4 or 8).

The following description is given only with reference to full-rate TCH channels and SDCCH/4 channels that are most commonly used in the operated networks (M=4). It should be pointed out that the procedures described may be extended without problem to other types of logical channel such as half-rate TCH (M=2), SDCCH/8 (M=8) . . . .

The mobile stations and the base stations measure radio parameters for each dedicated communication channel representative of the conditions of this communication, in particular the power level received by the mobile station or the base station or the quality of the signal received by the mobile station or base station. These measurements are described in detail in GSM Recommendation 05.08 (Draft pr ETS 300 578, 2nd edition, Mar. 1995. European Telecommunications Standards Institute), to which reference may be made.

The measurements are taken at intervals determined by the SACCH multiframe (480 ms). For each direction of communication, the parameter RXLEV is the average of the field levels of samples received over the period of 480 ms. Each value of RXLEV is coded decibel by decibel over six bits, the value RXLEV=0 corresponding to a power of less than −110 dBm and the value RXLEV=63 corresponding to a power greater than 48 dBm. For each direction of communication, the quality parameter RXQUAL is derived from the bit error rates received on the channel over the period of 480 ms, estimated on the basis of the metrics used in the Viterbi channel equaliser and/or the Viterbi convolutional decoder. Each value of RXQUAL is coded from 0 to 7 depending on the value ranges within which the observed binary error rate falls (respectively 0%–0.2%/0.2%–0.4%/0.4%–0.8%/0.8%–1.6%/1.6%–3.2%/3.2%–6.4%/6.4%–12.8%/12.8%–100%). From RXQUAL=4 upwards, it can be said that the quality of the radio link is becoming poor.

The measurements taken by the mobile station on the downlink are incorporated in a message referred to as a MEASUREMENT_REPORT in the GSM terminology. As part of the procedures for controlling radio links, the base station transmits these measurements to its BSC in a message referred to as MEASUREMENT RESULT, in which it also includes the measurements it has taken on the uplink. These measurements are processed at the level of the BSC, which performs the control functions on radio links.

The present invention proposes that these measurement samples received by the BSC be processed as part of a dynamic channel allocation process. This process may be implemented entirely at the level of the BSC, which means that there will be no need for any specific adjustments to the GSM protocols.

Figure 2:
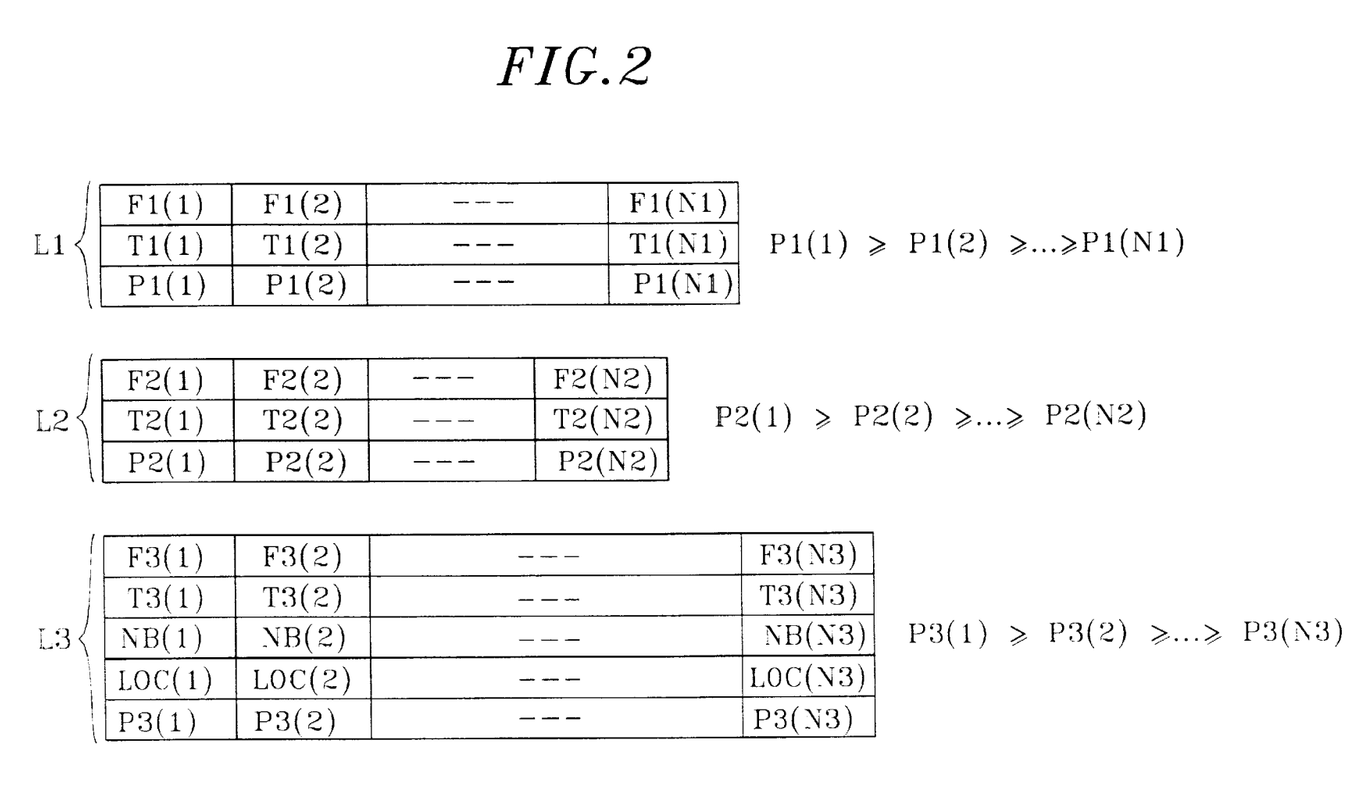
FIG. 2 shows data stored for each base station in the network illustrated in FIG. 1.

Each BSC 20 is associated with a memory 22 (FIG. 1), which contains lists of channels for each base station 10, 14, 15 which it controls. The structure of these lists L1, L2, L3 for each of the base stations is illustrated in FIG. 2.

The first list L1 contains the physical channels which are not busy at the instant in question, i.e. which are not being used by the base station to communicate with any mobile station.

In order to manage the list L1, the memory 22 contains three tables F1, T1, P1 of a length at least equal to the number N of physical channels in the set of channels covered by the DCA mechanism. If N1 denotes the number of non-busy channels at the instant in question, each of these channels i ($1 \leq i \leq N1$) corresponds to the timeslot T1(i) ($1 \leq T1(i) \leq 8$) on the communication frequency F1(i) and is associated with a priority index P1(i). These three tables are arranged in decreasing order of the priority indices P1(i).

The second list L2 contains the physical channels used as traffic channels TCH, at the instant in question, between the base station and a mobile station.

In order to operate the list L2, the memory 22 contains three tables F2, T2, P2 of a length at least equal to the number N of physical channels in the set of channels covered by the DCA mechanism. If N2 denotes the number of physical channels supporting an active logical channel TCH at the instant in question, each of these channels j ($1 \leq j \leq N2$) corresponds to the timeslot T2(j) ($1 \leq T2(j) \leq 8$) on the communication frequency F2(j) and is associated with a priority index P2(j). These three tables are arranged in decreasing order of the priority indices P2(j).

The third list L3 contains the physical channels supporting one or more logical channels SDCCH at the instant in question.

In order to manage the list L3, the memory 22 contains five tables F3, T3, NB, LOC, P3 of a length at least equal to the number N of physical channels in the set of channels covered by the DCA mechanism. If N3 denotes the number of physical channels supporting at least one active channel SDCCH at the instant in question, each of these channels k ($1 \leq k \leq N3$) corresponds to the timeslot T3(k) ($1 \leq T3(k) \leq 8$) on the communication frequency F3(k) and is associated with a priority index P3(k). NB(k) represents the number of logical channels SDCCH supported by the k-th physical channel on the list L3 ($1 \leq NB(k) \leq M$) and LOC(k) locates the positions of these channels SDCCH on the physical channel. LOC(k) therefore consists of four bits LOC(k,m) such that LOC(k,m)=1 if an active SDCCH channel occupies the m-th logical channel position ($1 \leq m \leq M$) of the k-th physical channel in the list L3 and LOC(k,m)=0 otherwise. These five tables F3, T3, NB, LOC, P3 are arranged in decreasing order of the priority indices P3(k).

Each of the physical channels processed by the DCA method belongs to one of the three lists L1, L2, L3 and is therefore associated with a respective priority index P1(i) or P2(j) or P3(k). These priority indices are computed and updated during the radio communications taking place on the channels in question, i.e. whilst the channels in question are in the list L2 or in the list L3.

Turning to FIGS. 3 to 6, we will now look at the procedures implemented by the invention in order to manage the lists L1, L2, L3 and dynamically allocate channels to the communications.

In a GSM network, the choice as to what method is used to allocate a SDCCH channel is left to the manufacturer. Some prefer to allocate a SDCCH channel on a completely free physical channel, in anticipation of the fact that this latter will then be used by the TCH channel which will follow. In this case, the method will select an accessible physical channel from the list L1 which has a maximum priority index.

"Accessible physical channel" refers to a physical channel which can be allocated to a transmitter-receiver unit (TRX) of the base station. A free physical channel F1(i), T1(i) from the list L1 will be inaccessible if, for example, all the TRX of the base station are already busy on the time slot T1(i).

In the case of a short message service, the option outlined above has the disadvantage of reserving a full physical channel solely for an SDCCH channel throughout the duration of the message transmission, i.e. the bandwidth is not optimised.

Figure 3:
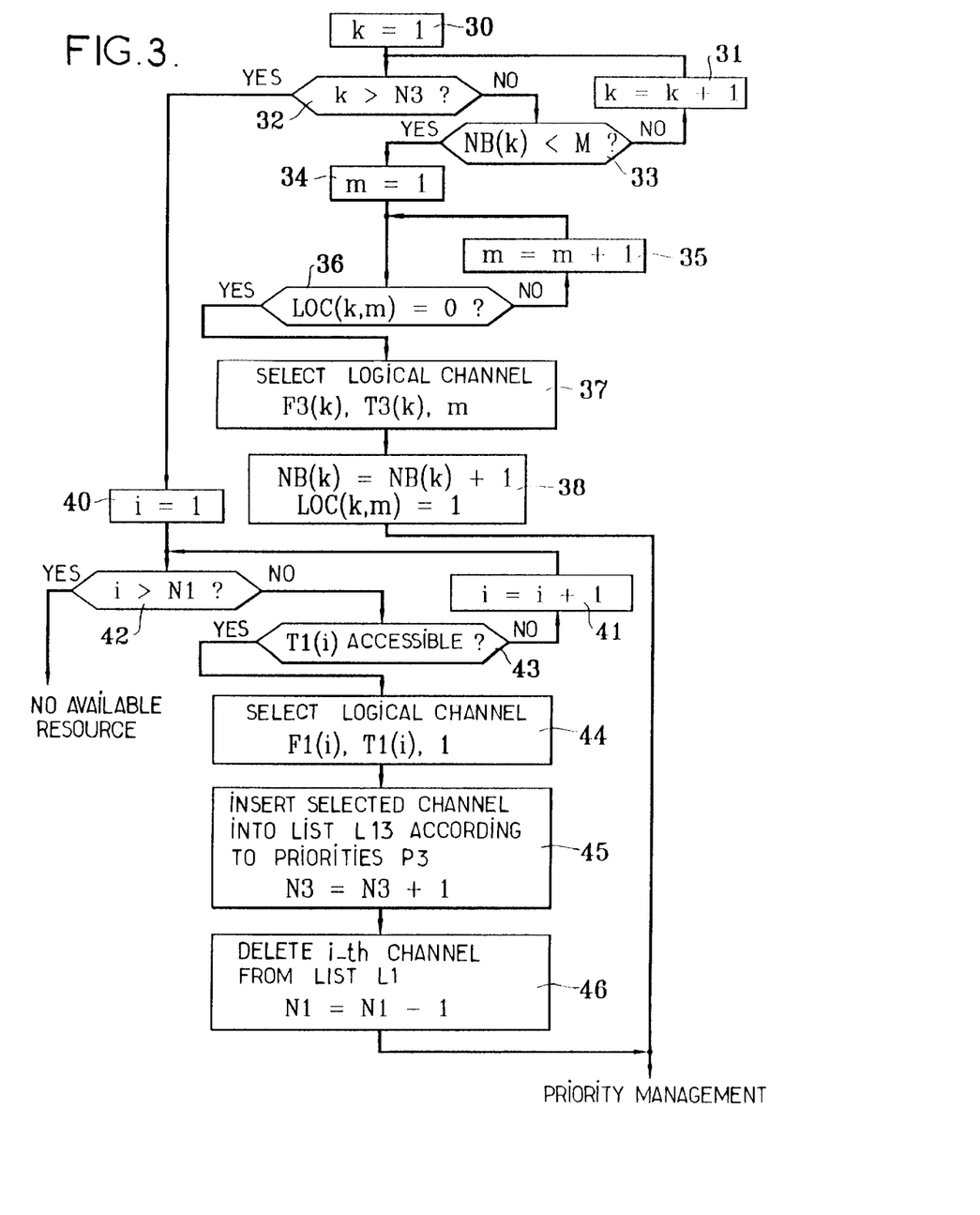
FIGS. 3 to 6 are flow charts illustrating the procedures applicable in a method according to the invention.

A preferred option when allocating a new logical channel SDCCH, one implementing mode of which is illustrated in FIG. 3, is to give precedence to a physical channel from the list L3 which has at least one free SDCCH component. If such a channel is not available, the free and accessible physical channel having the highest priority will be selected from the list L1.

Turning to FIG. 3, the search loop used to find a SDCCH channel among the physical channels in the list L3 starts at step 30 with the initialisation k=1. This index k is incremented by one unit at step 31 if k≦N3 and NB(k)=M (successive comparisons 32 and 33). If the comparison 33 reveals a channel k having at least one free SDCCH component (NB(k)≦M), the BSC will determine the position m of such a component (LOC(k,m)=0) in a loop 34–36. The non-active logical channel corresponding to the position m of the physical channel F3(k), T3(k) is then selected at step 37 as being the SDCCH channel to be allocated. The list L3 is then updated 38 simply by increasing the number NB(k) of SDCCH components occupied on the physical channel by one unit and taking LOC(k, m)=1. The BSC then moves on to the procedure of managing the priority index of the physical channel supporting the logical channel, which will be described below.

If the comparison 32 shows that no physical channel in the list L3 can be used to support the SDCCH channel to be allocated (k>N3), the BSC will search for the free and accessible physical channel with the highest priority.

The search loop is initialised by i=1 at step 40. This index i is incremented by one unit at step 41 if i≦N1 and the timeslot Ti(i) is inaccessible (successive tests 42 and 43). If the comparison 42 shows that i>N1, the channel allocation fails because of the absence of available radio resources. Under normal circumstances, the test 43, which may simply consist in checking that the number of physical channels already allocated and having the same timeslot index as the channel tested is less than the number of TRX of the base station, will pinpoint a free and accessible channel i. An arbitrary logical channel (for example that of rank 1) of this physical channel F1(i), T1(i) is then selected at step 44 as the SDCCH channel. The BSC then updates the lists L1 and L3. At step 45, it inserts in list L3 the physical channel supporting the logical channel which has just been selected (where NB=1 and LOC=1000), increases the length N3 of the list L3 by one unit and rearranges this list in the order of decreasing priority indices P3. At step 46, the i-th channel from the list L1 which has just been selected is deleted from this list, the length N1 of which is decreased by one unit and its elements are rearranged in order of the decreasing priority indices P1. The BSC then moves on to the procedure of managing the priority index of the physical channel that has just been allocated.

Concerning the procedure of allocating a traffic channel TCH, the GSM standards give operators a certain degree of latitude. Accordingly, a TCH channel may be allocated at the first request for radio resources ("Very Early Assignment" method) or may not occur until a SDCCH channel has been established. For reasons of optimising radio resources, operators generally prefer to assign a SDCCH channel and then a TCH channel. In the latter case, the TCH channel allocated for a communication may be either the physical channel which was already occupied by the SDCCH channel or a free physical channel. The procedure of allocating a TCH channel illustrated in FIG. 4 allows these different situations to be taken into account.

Figure 4:
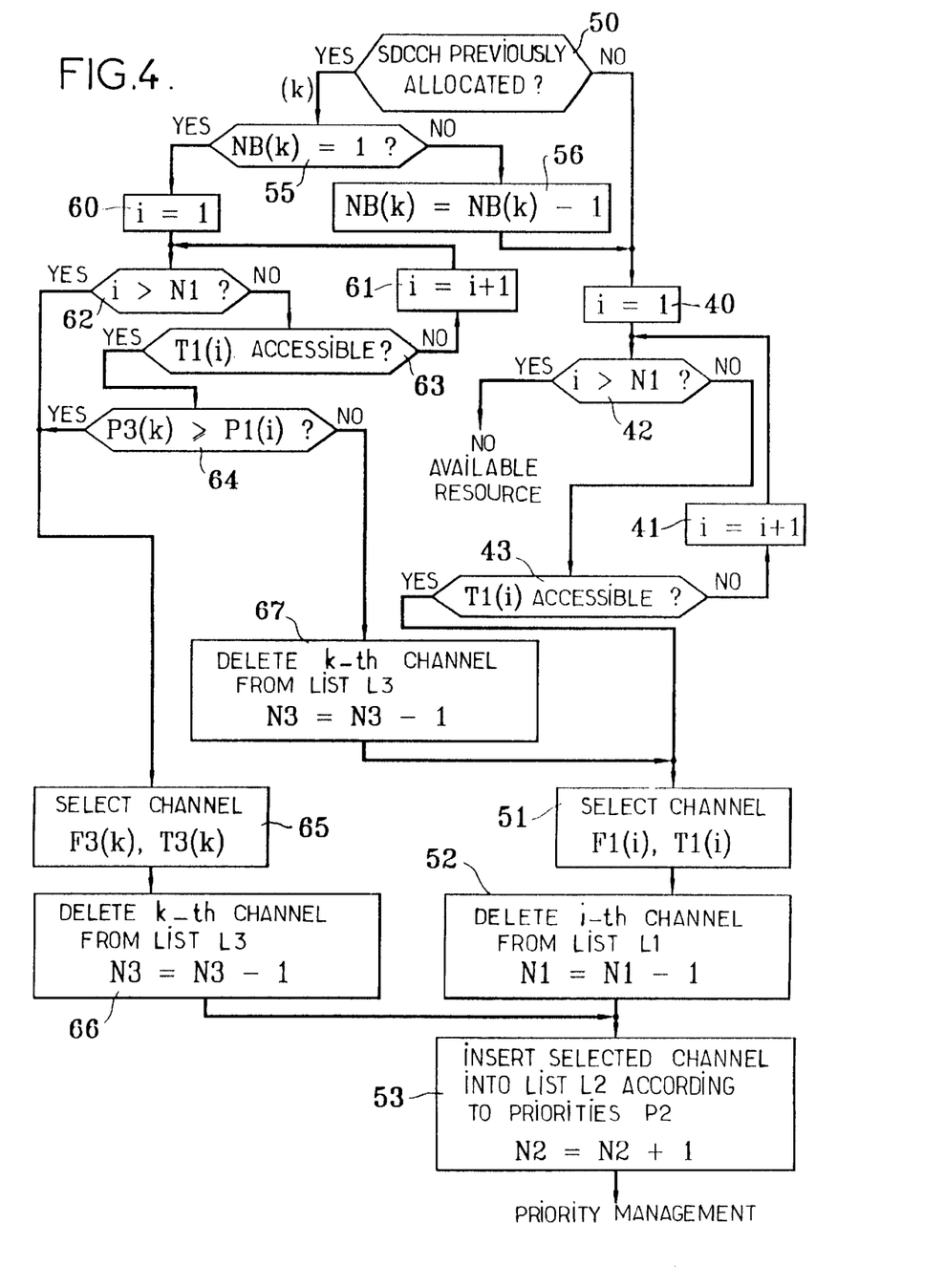

The first step 50 consists in examining whether a SDCCH channel was allocated prior to connecting the requested TCH channel. There are two general situations in which the TCH channel may be allocated without this being preceded by the allocation of a SDCCH channel:

the operator is using a "Very Early Assignment" method; or establishment of the TCH is responsive to a handover (HO) between two TCH channels.

If no SDCCH channel was allocated, the BSC will run a loop 40–43 similar to that described above with reference to FIG. 3 in order to identify the accessible physical channel from the list L1 which has the highest priority index. Allocation of the TCH channel will fail if no such channel is available. The i-th physical channel in the list L1, identified as being the free and accessible channel with the highest priority, is then selected at step 51, then deleted from the list L1 at step 52. Finally, at step 53, the selected physical channel is inserted in the list L2, which the BSC rearranges in order of priority indices P2 and the number N2 of elements in this list is increased by one unit. The priority index of the channel which has just been selected is then managed in accordance with the procedure described below.

If the initial test 50 shows that a SDCCH channel was allocated prior to establishing the TCH channel, a check will be made during the comparison 55 as to whether the number NB(k) of active SDCCH components of the k-th physical channel in list L3 supporting the previously allocated SDCCH channel is equal to or different from 1. If it is different from 1, this number NB(k) is simply decreased by one unit at step 56 due to the closure of the SDCCH channel, and the BSC then proceeds to steps 40–43 and 51–53 described above in order to allocate the free and accessible physical channel with the highest priority.

If the comparison 55 shows that the k-th physical channel in the list L3 consisted of only the SDCCH channel allocated beforehand (NB(k)=1), the BSC will run a loop 60–63 similar to the loop 4043 to identify the accessible channel in list L1 which has the highest priority index P1(i).

In the absence of such a channel in the list L1 (i>N1 in a comparison 62), or if this maximum priority index P1(i) is not higher than the priority index P3(k) of the physical channel which supported the SDCCH channel (P3(k)≧P1(i) in comparison 64), the BSC will then select as the TCH channel the k-th physical channel in the list L3 at step 65. At the following step 66, it will delete from the list L3 the channel just selected, decrease the number N3 of busy channels in the list L3 by one unit and rearrange this list in decreasing order of the priority indices P3. The BSC will finally update the list L2 by inserting in it, at step 53, the channel that has just been selected.

If the comparison 64 shows that P3(k)<P1(i), it is preferable to allocate the i-th channel from the list L1 whose priority index is higher than that of the physical channel of the SDCCH. The BSC will then delete the k-th channel from the list L3 in a step 67 identical to step 66 before proceeding to steps 51 to 53 to select the i-th channel from the list L1 and update the lists L1 and L2.

Figure 5:
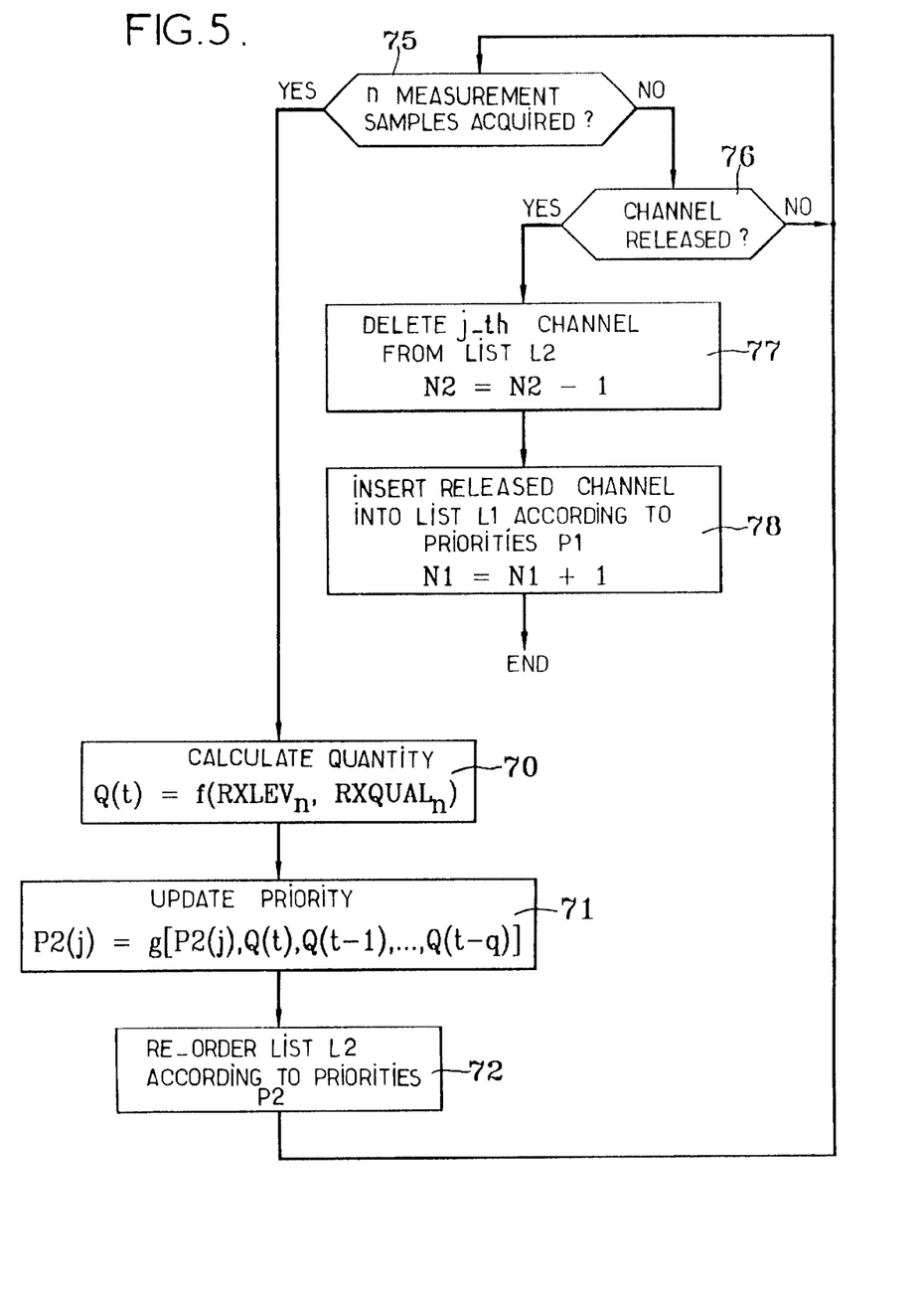

FIG. 5 is a flow chart showing a procedure for managing the priority index P2(j) of the j-th physical channel in the list L2 on which a communication is taking place between a mobile station and the base station. This procedure is illustrated in the context of a TCH channel (list L2) although it should be pointed out that it can be directly transposed to the case of a SDCCH channel (list L3).

As mentioned above, the priority indices are updated on the basis of radio measurements taken periodically on the uplinks and downlinks of the logical channel. A quality of the channel Q(t) is evaluated every n measurement samples, i.e. every n SACCH multiframes. As illustrated in block 70 of FIG. 5, the quality Q(t) may be based on mean values denoted by $RXLEV_n$, $RXQUAL_n$, relating to field levels RXLEV and quality parameters RXQUAL contained in the last n measurement samples. The averaged RXLEV and RXQUAL values may be those measured on the uplink, the downlink or alternatively in the two directions of communication. The number n is equal to 4, for example, which corresponds to an update of the priority indices approximately every 2 seconds. An example of a function $f(RXLEV_n, RXQUAL_n)$ which may be used to compute the quality values Q(t) is:

$f(RXLEV_n, 0) = 3$ $f(RXLEV_n, 1) = +3$ $f(RXLEV_n, 2) = +3 - 2.(RXLEV_n/63)$ $f(RXLEV_n, 3) = +1 - (RXLEV_n/63)$ $f(RXLEV_n, 4) = -1 - 2.(RXLEV_n/63)$ $f(RXLEV_n, 5) = -5 - 2.(RXLEV_n/63)$ $f(RXLEV_n, 6) = -9 - 3.(RXLEV_n/63)$ $f(RXLEV_n, 7) = -12$

At the next step 71, the BSC updates the priority index P2(j) of the channel on the basis of the last quality value computed or more generally on the basis of the last q quality values computed. The new priority index P2(j) is equal, e.g., to the mean value of the last q quality values computed. The update function g, shown in block 71 of FIG. 5, is then:

$$g[P2(j), Q(t), \ldots, Q(t-q)] = P2(j) + [Q(t) - Q(t=q)]/q,$$

the priority indices of all the physical channels being initialised at 0 at the start of the DCA process.

After updating 71 the priority index P2(j), the list L2 is rearranged at step 72 in decreasing order of priority.

If the channel F2(j), T2(j) was released before n new measurement samples were acquired (tests 75 and 76), the priority index P2(j) cannot be updated. This being the case, the BSC updates the lists L1 and L2 at steps 77 and 78, by shifting the released channel from list L2 to list L1 (in the situation where a SDCCH logical channel is released whose physical channel has one or more other SDCCH channels, steps 77 and 78 are replaced by a simple decrease of the number NB(k) and by inverting the corresponding bit of LOC(k)).

Figure 6:
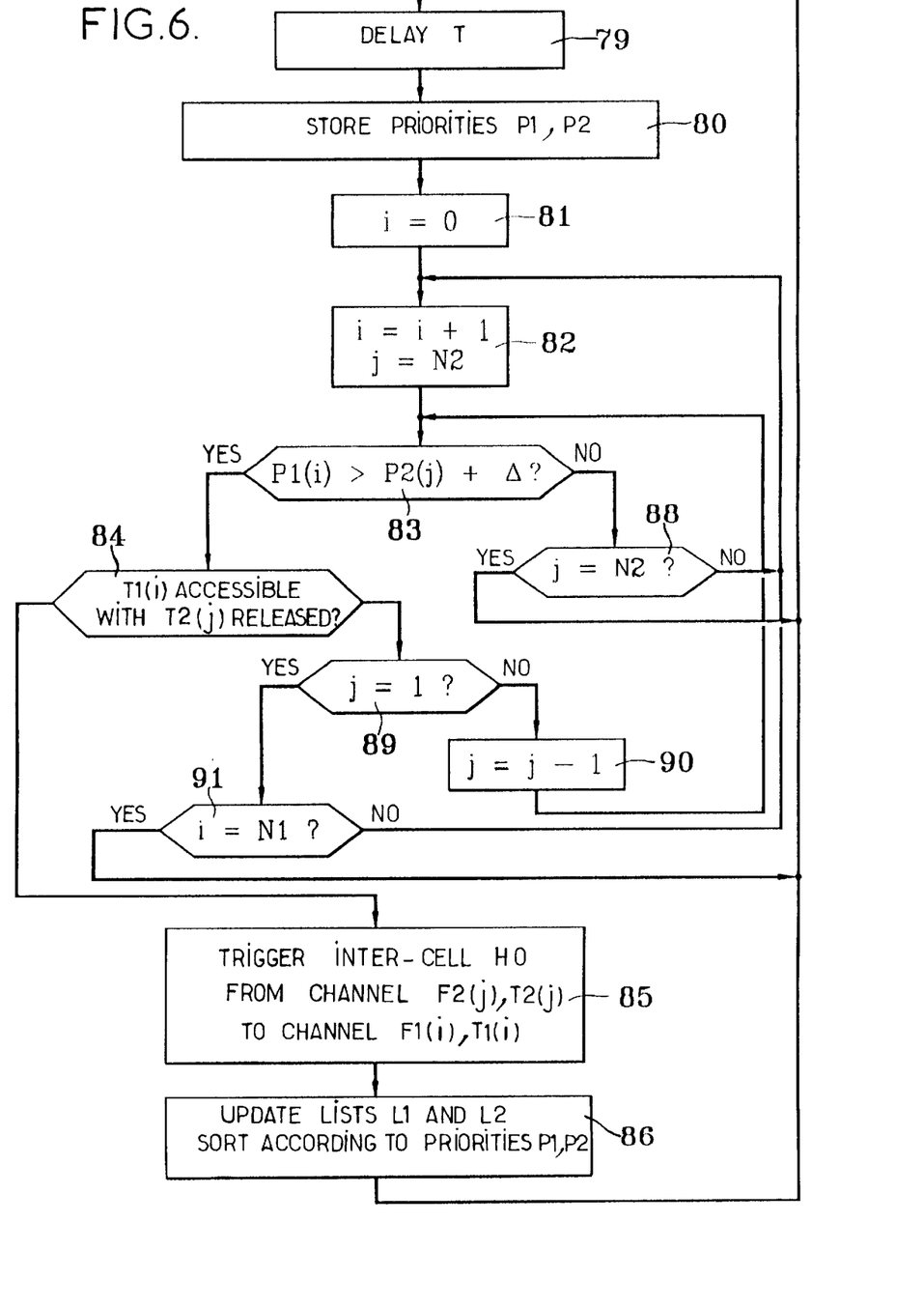

FIG. 6 is a flow chart showing a procedure for optimising the DCA mechanism. This procedure is intended to trigger intra-cellular handovers in order to optimise the use of the physical channels with the highest priority, which in principle are the most reliable. This procedure controls two main actions:

when a logical channel is released, if the physical channel which it occupied has a higher priority than that of a physical channel currently being used by a logical channel of the same type, the BSC will trigger an intra-cellular handover for this latter logical channel to the released channel whose priority is higher, if there is a serious deterioration in the quality of a physical channel, the procedure initiates for each of the logical channels which it supports an intra-cellular handover to another physical channel as soon as the priority of the physical channel being used becomes lower than the priority of another physical channel capable of supporting the logical channel.

The operations performed in response to the triggering of an intra-cellular handover are described in detail in the above-mentioned GSM Recommendation 05.08 and will not be described in detail here.

The optimisation procedure may be used for traffic channels and for the SDCCH channels as well. However, since the duration of usage of SDCCH channels is generally short and since several of these channels can be multiplexed on the same physical channel, it seems preferable to apply the optimisation procedure to the traffic channels only. This will avoid a large number of intra-cellular handovers of SDCCH channels.

A clock is used so that the optimisation procedure is performed at regular time intervals only (period T). At the end of this period, i.e. at the end of the timing step 79, the tables P1 and P2 containing the ordered priority indices of the physical channels of lists L1 and L2 are saved in a working memory (step 80) so that the optimisation procedure will use fixed lists so as not to be disrupted by updates which might take place when running the procedure described with reference to FIG. 5. The period T may be limited to a few tens of milliseconds (for example T=20 ms) to avoid a situation where this fixing of priority indices at step 80 could cause the system to work with obsolete data.

After saving the priority indices P1, P2, the pointer index i to the list L1 is initialised to zero at step 81. At the following step 82, this index i is incremented by one unit and the pointer index j to the list L2 is initialised to the length N2 of this list. The priority index of the i-th channel in the list L1 and the j-th channel in the list L2 are compared at step 83. If $P1(i) > P2(j) + \Delta$, the BSC will trigger an intra-cellular handover of the channel F2(j), T2(j) to the channel F1(i), T1(i) at step 85, provided the test 84 shows that the timeslot T1(i) is accessible to one of the TRX, taking account of the possible release of the slot T2(j). After triggering the handover, the BSC updates the lists L1 and L2 by permutating the channels that were involved in the handover and re-sorting the lists into decreasing order of priority at step 86.

The margin $\Delta$ may be equal to 0. It may also be greater than 0 if it is desirable to avoid triggering handovers which would provide only a small quality gain.

If the comparison 83 shows that $P1(i) \leq P2(j) + \Delta$, the pointer index j to the second list L2 is compared with the length N2 of this list at step 88. If j=N2, then list L1 does not contain a physical channel with a priority index high enough to make it worthwhile triggering a handover from the physical channel being used and having the lower priority index. This being the case, the optimisation procedure will terminate by returning to the timing step 79. If the comparison 88 shows that j<N2, the BSC returns to step 82 to check whether the next channel on the list L1 would be a good candidate for an intra-cellular handover.

If the test 84 shows that the i-th free physical channel in the list L1 is not accessible to receive a communication currently underway on the j-th channel of the list L2, the pointer index j to the list L2 is compared with 1 at step 89. If j>1, this index is reduced by one unit at step 90 before the BSC runs a new comparison 83. If the comparison 89 shows that j=1, the pointer index i to the list L1 is compared with the length N1 of this list at step 91. If i=N1, it is because the scan through the list L1 did not reveal any accessible channel with a high enough priority and the optimisation procedure is terminated, returning to the timing step 79. If the comparison 91 shows that i<N1, the BSC returns to step 82 in order to test the next channel on the list L1.

It should be pointed out that FIG. 6 allows a single intra-cellular handover for each period T only, which is generally sufficient, given the relatively low value of T. However, it would be possible to trigger several handovers between pairs of channels complying with the criteria of the comparison 83 during this period.

The optimisation method described above is relatively simple to implement, all the more so since, in the great majority of cases, the BSC will follow the flow chart either along route 80–83, 88, 79 or route 80–86, 79.

It should be pointed out that there is a certain latitude in defining the concept of physical channel, to which a priority index is allocated in the method proposed by the invention.

In the description given above, we have referred to the concept of the physical channel which is the most natural for the TDMA/FDMA structure of GSM systems, namely the fact that a physical channel corresponds to a carrier frequency $F1(i)$, $F2(j)$, $F3(k)$ and to a timeslot number $T1(i)$, $T2(j)$, $T3(k)$. In the case of a half-rate GSM system, for example, it would be conceivable to consider physical channels of half capacity as a means of managing the priority indices. Many other conventions would also be possible.

What is claimed is:

1. A method of dynamically allocating channels in a cellular radio network, wherein a set of physical channels is used in said network to form logical channels dedicated to communications in circuit mode between mobile stations and geographically distributed base stations, each logical channel belonging to a physical channel, and wherein, for each communication established on a logical channel between a base station and a mobile station, radio parameters representative of conditions of said communication on said logical channel are periodically measured, the method comprising the following steps, carried out for each base station:

associating a respective priority index to each physical channel of said set;

holding a first list of physical channels which are not being used by said base station to communicate with any mobile station, and at least a second list of busy physical channels, each having at least one active logical channel dedicated to a communication currently taking place between said base station and any mobile station;

updating the priority indices associated with the physical channels of the second list on the basis of the radio parameters measured in relation to communications taking place on the logical channels belonging to said physical channels of the second list; and when establishing a communication with a mobile station, selecting for said communication an accessible and non-active logical channel belonging to a physical channel whose priority index is maximum.

2. A method as claimed in claim 1, further comprising, for each base station, the step of comparing the priority indices of channels from the first and second lists in order to trigger a handover from a logical channel belonging to a busy physical channel from the second list to an accessible logical channel belonging to a physical channel from the first list whose priority index is higher than that of said busy physical channel from the second list.

3. A method as claimed in claim 1 wherein the physical channels of each list are ranked decreasing order of the priority indices.

* * * * *